US012371930B2

(12) United States Patent
Huck

(10) Patent No.: US 12,371,930 B2
(45) Date of Patent: Jul. 29, 2025

(54) VARIABLE RATIO RAILCAR DOOR MECHANISM

(71) Applicant: Trinity North American Freight Car, Inc., Dallas, TX (US)

(72) Inventor: Kenneth W. Huck, Fairview, TX (US)

(73) Assignee: TRINITY NORTH AMERICAN FREIGHT CAR, INC., Dallas, TX (US)

( * ) Notice: Subject to any disclaimer, the term of this patent is extended or adjusted under 35 U.S.C. 154(b) by 0 days.

(21) Appl. No.: 18/389,992

(22) Filed: Dec. 20, 2023

(65) Prior Publication Data

US 2024/0209662 A1 Jun. 27, 2024

Related U.S. Application Data

(60) Provisional application No. 63/476,482, filed on Dec. 21, 2022.

(51) Int. Cl.

*E05B 83/02* (2014.01)
*E05F 11/54* (2006.01)

(52) U.S. Cl.

CPC .............. *E05B 83/02* (2013.01); *E05F 11/54* (2013.01); *E05Y 2201/712* (2013.01); *E05Y 2900/51* (2013.01)

(58) Field of Classification Search

CPC ........... E05D 15/1007; E05Y 2201/618; E05Y 2900/51; E05Y 2201/712; E05Y 2201/718; E05B 83/02

See application file for complete search history.

(56) References Cited

U.S. PATENT DOCUMENTS

| | | | | |
|---|---|---|---|---|
| 3,332,168 A * | 7/1967 | Madland | E05B 83/02 | 49/220 |
| 3,386,205 A * | 6/1968 | Herr | E05B 83/02 | 49/276 |
| 3,555,731 A * | 1/1971 | Ross | E05B 83/02 | 49/210 |
| 3,613,312 A * | 10/1971 | Wolak | E05D 15/1007 | 49/130 |
| 3,660,938 A * | 5/1972 | Ross, Jr. | E05D 15/1007 | 49/220 |
| 4,020,594 A * | 5/1977 | Ceyer | E05D 15/1007 | 49/395 |
| 6,463,861 B1 * | 10/2002 | Nottingham | B61D 19/005 | 105/378 |
| 6,546,611 B1 * | 4/2003 | Ryan | E05B 83/10 | 292/336.3 |

(Continued)

FOREIGN PATENT DOCUMENTS

CA 3224745 A1 * 6/2024 ............... E05B 7/00

*Primary Examiner* — Justin B Rephann

(74) *Attorney, Agent, or Firm* — Baker Botts L.L.P.

(57) ABSTRACT

According to particular embodiments, a door operating system comprises: a rotating handle removably coupled to a first gear; the first gear coupled to a second gear; the second gear removably coupled to a worm gear; and the worm gear coupled to a rotating plate. Rotation of the handle rotates the first gear which rotates the second gear which rotates the worm gear which rotates the rotating plate to cause the door to open or close. The first gear is swappable with the second gear to modify a gear ratio of the door operating system.

5 Claims, 5 Drawing Sheets

(56) References Cited

U.S. PATENT DOCUMENTS

| | | | | |
|---|---|---|---|---|
| 6,637,347 | B1 * | 10/2003 | Richard | E05B 83/02<br>105/378 |
| 6,644,215 | B1 * | 11/2003 | Mundinger | B61D 19/009<br>105/307 |
| 6,659,018 | B1 * | 12/2003 | Jackson | E05B 15/0046<br>292/201 |
| 11,555,535 | B1 * | 1/2023 | Stryffeler | F16H 1/125 |
| 2003/0000416 | A1 * | 1/2003 | Nottingham | B61D 19/00<br>105/378 |
| 2007/0137518 | A1 * | 6/2007 | Bell | E05B 83/02<br>105/378 |
| 2007/0283842 | A1 * | 12/2007 | Hepburn | E05B 83/02<br>105/378 |
| 2015/0175175 | A1 * | 6/2015 | Early | B61D 39/006<br>105/377.01 |
| 2021/0394802 | A1 * | 12/2021 | Waldo | B61D 19/02 |
| 2022/0371630 | A1 * | 11/2022 | Gachhadar | B61D 19/001 |

* cited by examiner

VARIABLE RATIO RAILCAR DOOR MECHANISM

RELATED APPLICATION

This application claims priority to U.S. Provisional Application Ser. No. 63/476,482, entitled "VARIABLE RATIO RAILCAR DOOR MECHANISM," filed Dec. 21, 2022.

TECHNICAL FIELD OF THE INVENTION

This disclosure relates generally to doors for a railcar, such as a boxcar.

BACKGROUND

Particular railcars have doors for loading and unloading of commodities. One example is a boxcar. A boxcar refers to a railcar that is enclosed and generally used to carry freight. Boxcars may have side sliding doors or plug doors of varying size and operation.

SUMMARY

Particular embodiments are directed to a variable ratio railcar door mechanism. For example, according to particular embodiments, a door operating system comprises: a rotating handle removably coupled to a first gear; the first gear coupled to a second gear; the second gear removably coupled to a worm gear; and the worm gear coupled to a rotating plate. Rotation of the handle rotates the first gear which rotates the second gear which rotates the worm gear which rotates the rotating plate to cause the door to open or close. The first gear is swappable with the second gear to modify a gear ratio of the door operating system.

In particular embodiments, the first gear is a different size than the second gear. The first and second gears may comprise bevel gears, helical gears, etc.

In particular embodiments, the door operating system further comprises a third gear and a fourth gear. The third gear and the fourth gear have a same center-to-center distance as the first gear and the second gear but have a different gear ratio than the first gear and the second gear. The third gear is swappable with the first gear and the fourth gear is swappable with the second gear to modify a gear ratio of the door operating system.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
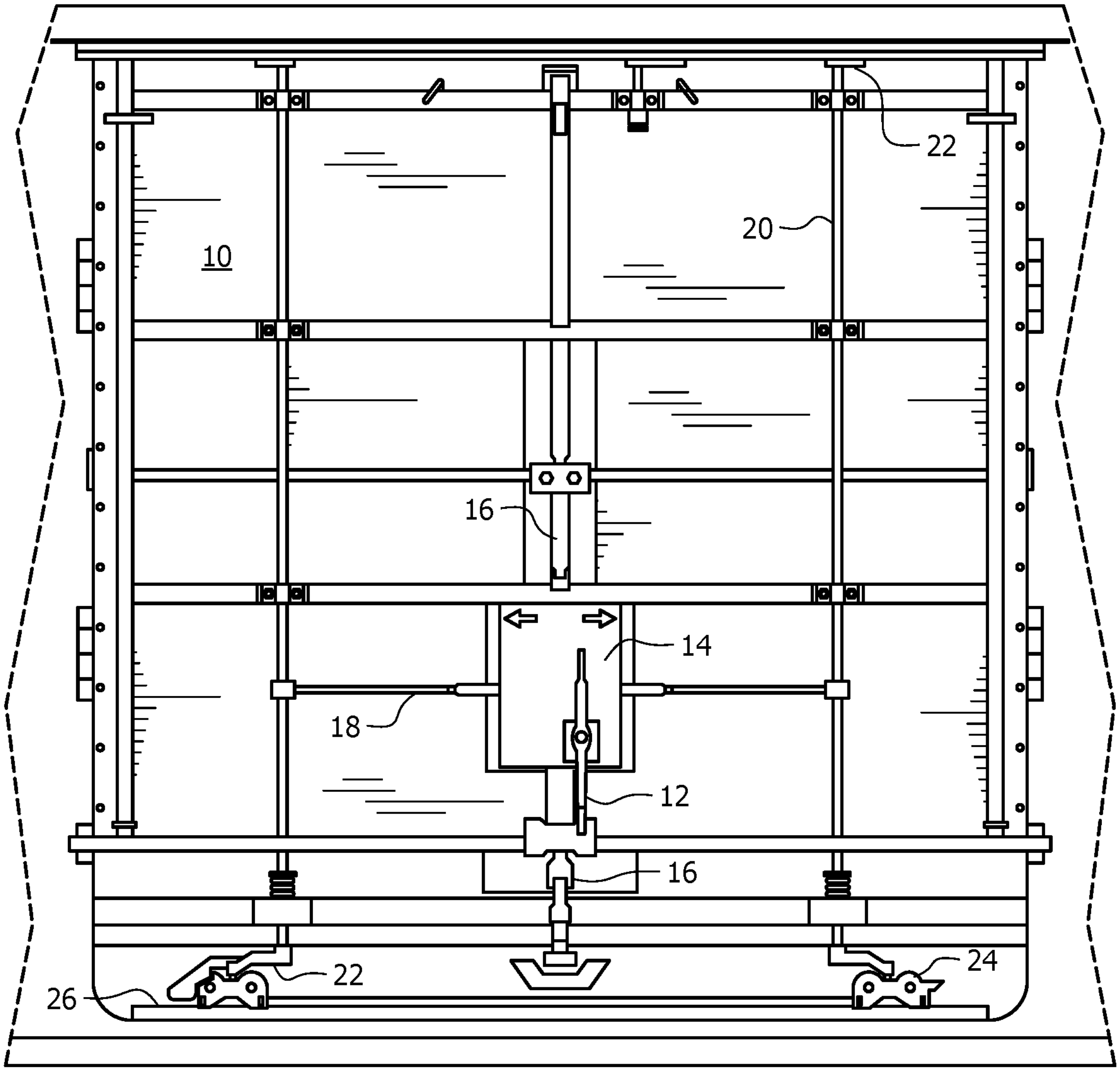
FIG. 1 is a side view of a boxcar car illustrating a single plug door.

Railcar door types vary depending upon the type of railcar (e.g., boxcar), based upon the commodity being transported. Some commodities do not require a tight sealing door and a sliding door is sufficient. The sliding door may or may not use a sealing gasket. Other commodities may require protection from the outside environment, such as rain, and may use an uninsulated plug door, again with or without a scaling gasket. Further protection from the outside environment may be provided by an insulated plug door, such as used on insulated and refrigerated boxcars, and uses a sealing gasket.

Doors are used to close the railcar body access opening to provide security for the railcar contents and protect the commodity from the external environment. A desirable characteristic is that the doors are flush with the inside walls of the railcar when closed to prevent accidentally catching the door edge when moving commodity within the railcar. Another desirable characteristic is that the doors are flush on the outside with the sides of the railcar for safety and aerodynamics.

To access the interior of the railcar, the doors are moved away transversely from the railcar body and rolled on a door track parallel to the railcar sides and attached to the side of the railcar. Restrictions exist on the width of the railcar when the doors are open to provide sufficient clearance for loading docks or other obstacles.

Sliding and plug doors use a mechanism to assist in opening and closing. Sliding doors are usually uninsulated and therefore thinner in thickness than insulated plug doors and require less inward/outward movement than thicker insulated and uninsulated plug doors. Even without a sealing gasket, sliding doors may provide some sealing by overlapping the door and doorposts. To minimize the clearance between the door and the railcar body when closed, the door is rolled in front of the door opening and then moved inward toward the railcar body to fully close. Plug doors also move inward toward the railcar body to fully seal. If the door uses a scaling gasket, this motion also compresses the gasket for a tight seal. When the door is fully closed, lock bars may be engaged to prevent unwanted entry into the interior of the railcar.

Door mechanism designs usually incorporate a handle that is manually rotated to move the door inward during closing and outward when opening. The door is supported on wheels in a track attached to the railcar body. Rotating the handle rotates a plate through a gear mechanism rotationally attached to the door. Attached to the rotating plate are rods that connect to vertical pipes, also rotationally attached to the door to the left and right of the handle such that rotational movement of the plate creates rotational movement of the pipes. Connected to the bottom and top of each pipe is a crank arm that rotates with the pipe and is connected wheels captured on a track, which is connected to the railcar body. Rotation of the handle rotates the plate, which rotates the vertical pipes through the rods, which in turn rotates the crank arms. This moves the door inward or outward with respect to the railcar body depending upon the direction of rotation of the handle.

In addition to moving the door inward and outward, rotation of the handle also engages and disengages lock bars that secure the door to the railcar body. This is accomplished through lock bars also connected to or engaged with the rotating plate. When opening the door, the initial rotation of the handle and rotating plate disengages the lock bar between the railcar body and the door, permitting it to move outward. When closing the door, the final rotational movement of the handle and rotating plate engages the lock bar between the railcar body and the door after the inward movement of the door is sufficient.

The lock bars and the door movement rods are connected to or engaged with the rotating plate symmetrically, meaning that the door latches work in opposite linear directions and the rods for the crank arms are connected to the rotating plate work in opposite directions. When the door is being opened from the fully closed position, the initial movement of the handle and rotating plate move both the lock bar mechanisms and the door crank arm mechanism at the same time. When closing the door, the final movements of the handle also move the crank arms and lock bar mechanisms at the same time.

Sometimes commodity within the railcar may shift against the inside of the doors, putting pressure on the door. The pressure may cause the door to become difficult to open because the increased pressure on the door requires more handle force to open the door. The handle force may exceed the AAR standard or human ergonomic standards.

Existing Association of American Railroads (AAR) standards require that the manual force on the handle not exceed 85 pounds of force for ergonomic reasons. This can be challenging for heavy doors due to friction of door mechanism components at the crank arms and door locks, and while compressing gaskets and moving other appendages on the door. In addition, different door sizes have different weights and insulated doors require more lateral movement because they are thicker than uninsulated doors. The lateral movement is required to move the door away from the railcar so the door can be rolled parallel to the side of the railcar away from the opening to provide access to the railcar interior.

With previous door mechanism designs, the gear ratio between the handle and the operating mechanism's rotating plate is fixed and the ratio that is optimum for one door design may not be desirable for a different door design. This results in costly design and procurement of different gears to change the speed of door opening and closing or the handle force.

Particular embodiments described herein optimize door opening and closing speeds as well as modify the handle force required. This facilitates identical parts to be used for different door designs or only two parts easily changed to obtain desired operating characteristics of the system. A worm gear style door operating mechanism is desirable because the worm gear provides anti-backlash and anti-drift properties required by the AAR.

A typical uninsulated plug door generally is thinner and lighter in weight and requires less lateral movement to open and close than an insulated plug door. For example, it may be desired that an uninsulated door open and close with only one or two rotations of the handle. Because of the relatively light weight of the door, this may be accomplished without exceeding the AAR requirement of 85 pounds of handle effort.

However, an insulated plug door is typically heavier and requires more lateral movement and would require more handle rotations to open and close because the gear ratio has to be changed to keep from exceeding the AAR 85 pound requirement.

This previously required different designs of the gear system, meaning different parts, which can be more expensive to procure. Particular embodiments described herein facilitate the same parts to be used with only minor reassembly.

Particular embodiments will now be described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

FIG. 1 is a side view of a boxcar car illustrating a single plug door. Door 10 is illustrated in the closed position. To open door 10, handle 12 is rotated in the appropriate direction to operate door mechanism 14, hidden behind a cover in the illustrated example. Initial rotation of door mechanism 14 moves lock bars 16, upper and lower, vertically to disengage the door locks from the railcar body. Disengaging lock bars 16 frees door 10 to move away from the railcar body.

Continuing rotation of handle 12 and door mechanism 14 moves horizontal rods 18 inward toward door mechanism 14. Horizontal rods 18 are attached to ears welded to vertical pipes 20 such that their horizontal motion rotates pipes 20. Attached at the top and bottom of vertical pipes 20 are crank arms 22 that are attached to door support rollers 24 on track 26. As vertical pipes 20 are rotated, crank arms 22 swing through an arc, moving door 10 away from the railcar body. This motion continues until door 10 has sufficiently moved away from the railcar such that door 10 can be moved on track 26, parallel to the sides of the railcar, to provide access to the inside of the railcar.

Figure 2:
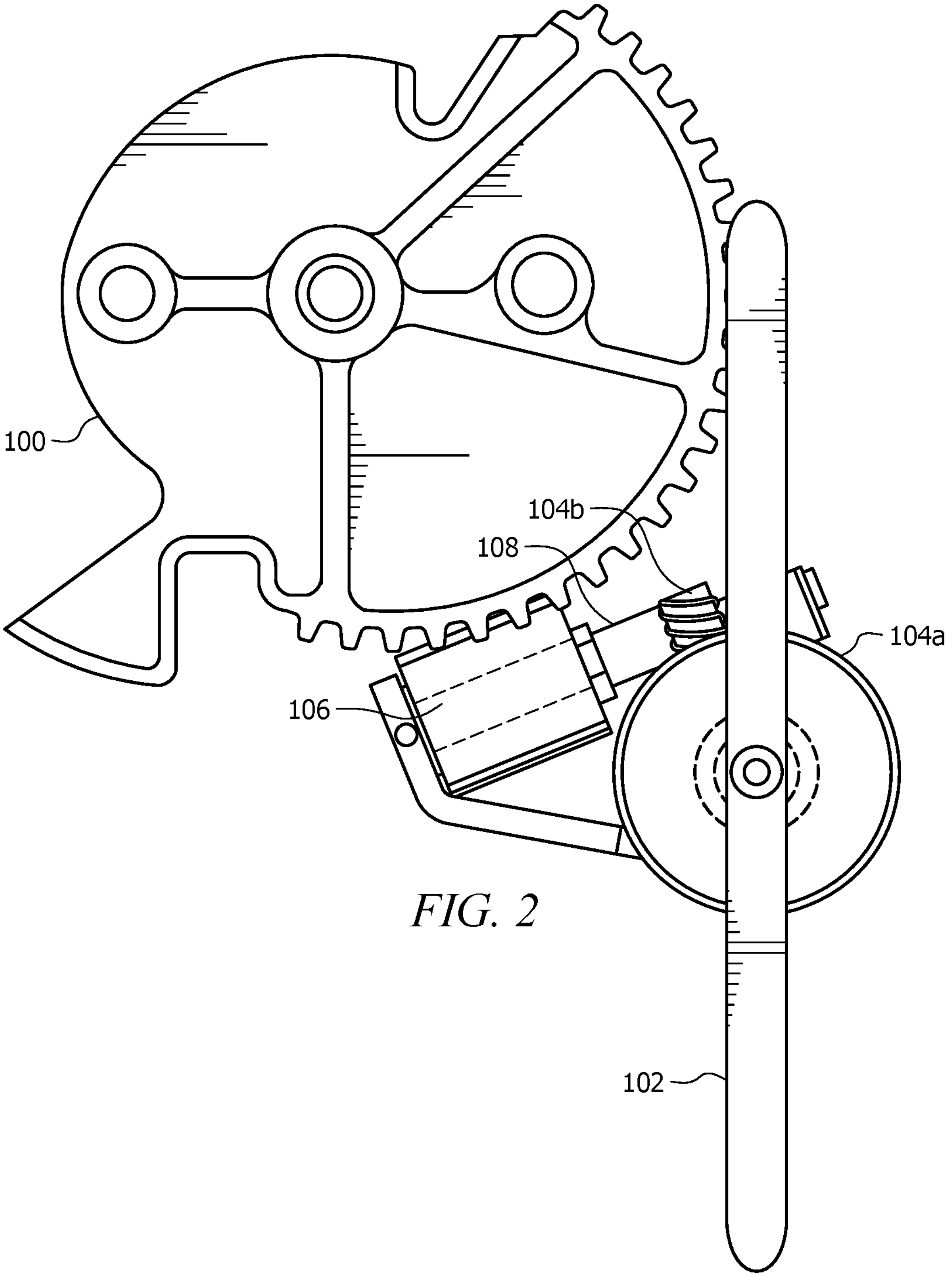
FIG. 2 is a schematic diagram illustrating a portion of a worm gear style door operating mechanism.
Figure 3:
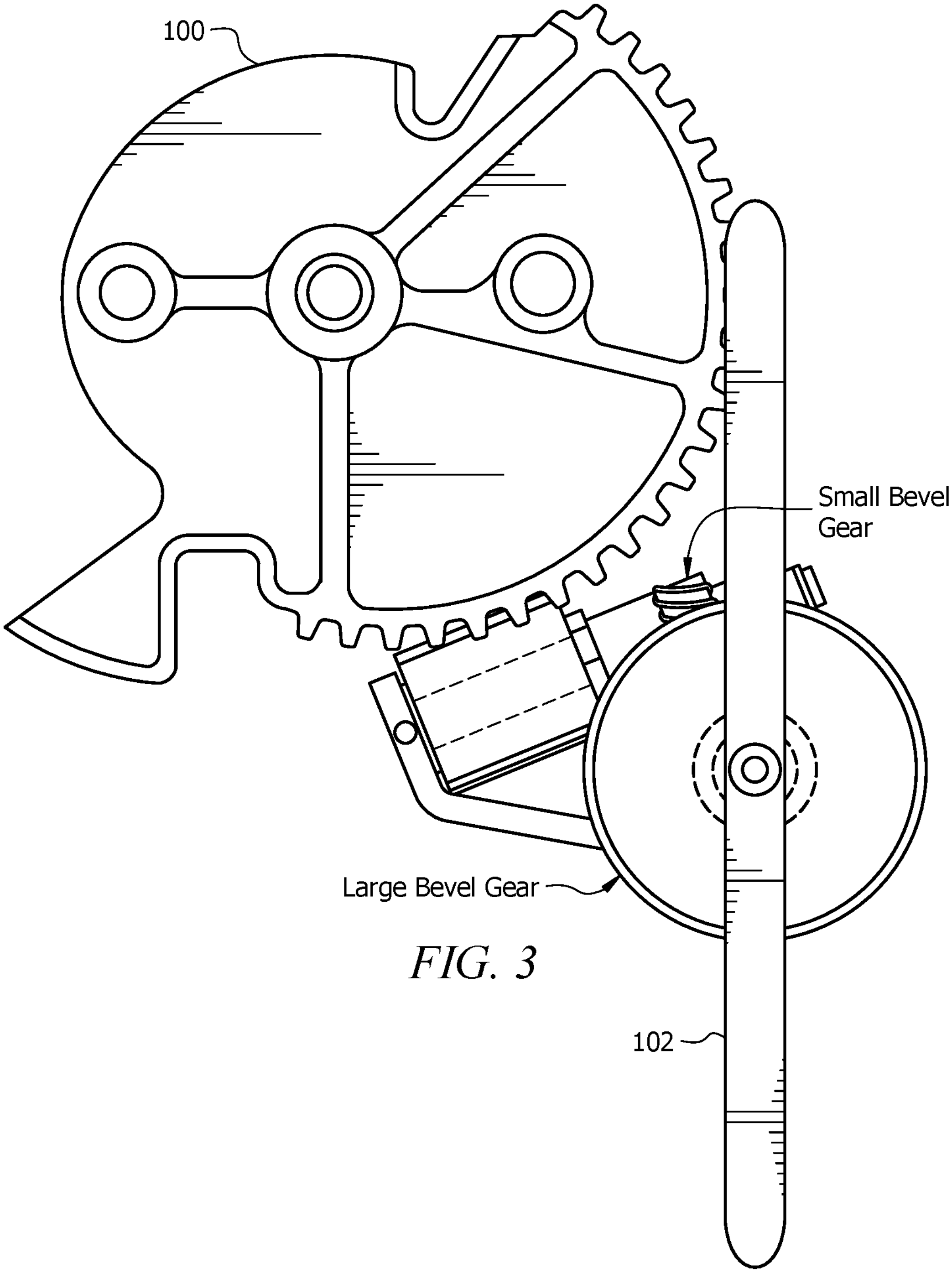
FIG. 3 is a schematic diagram illustrating a portion of a worm gear style door operating mechanism for an uninsulated door.
Figure 4:
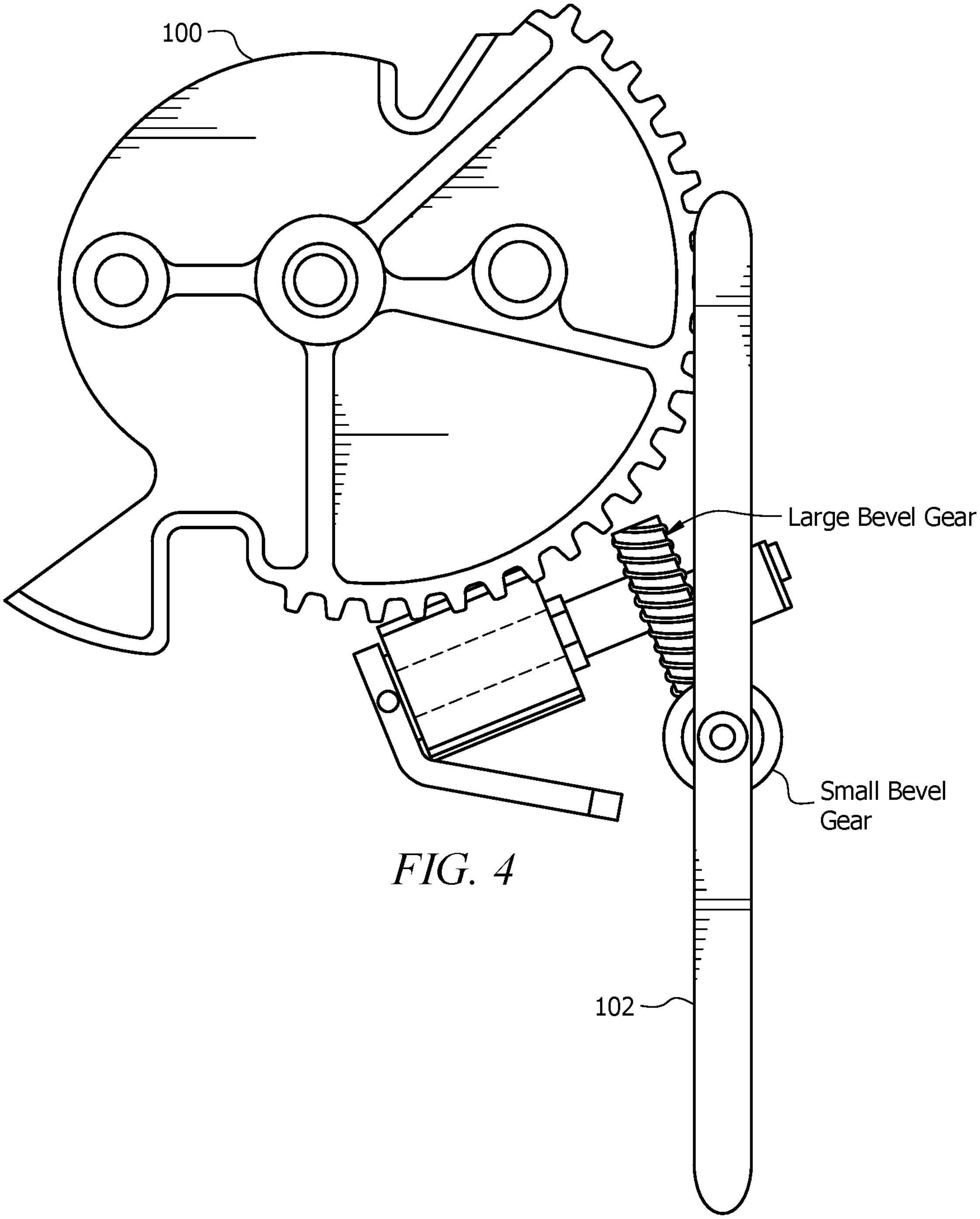
FIG. 4 is a schematic diagram illustrating a portion of a worm gear style door operating mechanism for an insulated door.

Handle 12 and door mechanism 14 are described in more detail with respect to FIGS. 2-4.

FIG. 2 is a schematic diagram illustrating a portion of a worm gear style door operating mechanism. An operator rotates handle 102 to rotate a set of, e.g., bevel gears 104. One bevel gear (i.e., 104*a*) is rotationally connected to handle 102 and the mating bevel gear (i.e., 104*b*) is rotationally connected to worm gear 106 through shaft 108 such that bevel gear 104 rotation turns worm gear 106. Worm gear 106 is engaged in teeth of rotating plate 100 such worm gear 106 rotation turns rotating plate 100. Worm gear 106 has a gear ratio to rotating plate 100 of X and handle 102 has a gear ratio to bevel gear 104 on the shaft of Y. Note: although a bevel gear is described in this embodiment, other types of gears may be used, such as helical gears.

One objective may be that the overall gear ratio between the handle and the rotating plate be different for an uninsulated plug door versus an insulated plug door. In some embodiments, the desired handle rotations for the uninsulated door may be about two rotations to move the door from "plugged" to "unplugged." The desired handle rotations for an insulated door may be about six rotations to move the door from "plugged" to "unplugged." This may be accomplished with the same parts by swapping the bevel/helical gears with each other.

In this embodiment, the rotating plate must rotate 90° to fully move the door from "plugged" to "unplugged" position, whether it is for an uninsulated door or an insulated door. If the overall ratio for an uninsulated door is desired to be 8:1, meaning the handle rotates eight revolutions for every one rotation of the rotating plate, but the rotating plate only needs to rotate one fourth of a rotation, then the number of handle rotations is 8/4=2 revolutions.

In this embodiment, the desired ratio for an insulated door may be 24:1, meaning 24 handle rotations for one rotating plate rotation. Again, the rotating plate only need to rotate 90°, or one quarter of a full revolution, so the handle rotations would be 24/4=6 revolutions.

The overall gear ratio is the product of the bevel/helical gear ratio and the worm gear ratio. For example, if the bevel gear on the handle (e.g., 104*a*) is larger than the bevel gear on the shaft (e.g., 104*b*), the ratio is >1. The ratio can be calculated by dividing the number of teeth on the handle bevel gear by the number of teeth on the shaft bevel gear. If the bevel gear on the handle is smaller than the bevel gear on the shaft, the ratio is <1, or equivalent to the reciprocal.

The overall gear ratio between the handle and the rotating plate is the product of the bevel gear ratio and the worm gear ratio. FIG. 2 shows the worm gear ration as "X" and the bevel gear ration as "Y". It may be desirable to assemble these parts so that the overall ratio for the uninsulated door and the insulated door can be achieved. This may be accomplished by swapping the shaft bevel gear with the handle bevel gear.

Below is an example of calculating the worm gear ratio and bevel gear ratio to do this. For the uninsulated door, the desired overall ratio of 8 is the product of X times Y. For the insulated door with the gears swapped, the overall gear ratio of 24 is the X divided by Y. These two equations permit calculation of the worm gear and bevel gear ratios.

$$X(1/Y) = 8,\ X(Y) = 24$$

X=8Y, substituting into the second equation, 8Y (Y)=8Y$^2$=24

Solving for Y, Y=square root (24/8)=1.73

Solving for X, X=24/1.73=13.85

Therefore, the worm gear ratio is 13.85 and the bevel gear ratio is 1.73.

For the uninsulated door, the handle bevel gear has 1.73 more teeth than the shaft bevel gear. This means the shaft rotated faster than the handle, which reduces the number of handle rotations required. For the insulated door with the bevel gears swapped, the shaft gear has 1.73 more teeth than the handle gear.

Because the same gears are used, the gear center-to-center distance of the bevel gear set is the same so the gear teeth engagement is the same. No new parts are needed.

In another embodiment, both bevel/helical gears may be exchanged with a different set of gears to change the ratio between the handle and the rotating plate. This may be accomplished by using gears with the same center-to-center distance as the existing gear set to change the handle force and number of handle rotations with respect to the rotating plate rotation.

One accomplished in the art can appreciate that this method may be applied to a wide range of desired gear ratios and designs. By selecting the desired ratios, the speed of opening and closing the door can be balanced with the handle forces needed to ensure the forces do not exceed requirements.

The bevel gears may be rotationally attached to the handle shaft and the worm gear shaft by a number of different ways, and yet allow them to be easily removed and swapped. In some embodiments, they may be splined onto the shafts with a pin or other fastener to hold them in position. One accomplished in the art can understand that there are multitudes of possible methods to do this.

FIG. 3 is a schematic diagram illustrating a portion of a worm gear style door operating mechanism for an uninsulated door. In the illustrated example, the large bevel gear is coupled to the handle and the small bevel gear is coupled to the worm gear shaft.

FIG. 4 is a schematic diagram illustrating a portion of a worm gear style door operating mechanism for an insulated door. In the illustrated example, the small bevel gear is coupled to the handle and the large bevel gear is coupled to the worm gear shaft. The large and small bevel gears have swapped positions from the example illustrated in FIG. 3.

In the event that the worm gear needs to be of a higher ratio to prevent back drive, the bevel or helical gears requirements may be such that swapping them with each other does not provide the desired overall ratio between handle rotation and gear sector rotation. In this case, because the gears are easily removeable, the gears may be swapped out with another set of gears designed with the same gear center distance but with a different ratio to continue using the rest of the overall mechanism without having to replace the entire mechanism.

Figure 5:
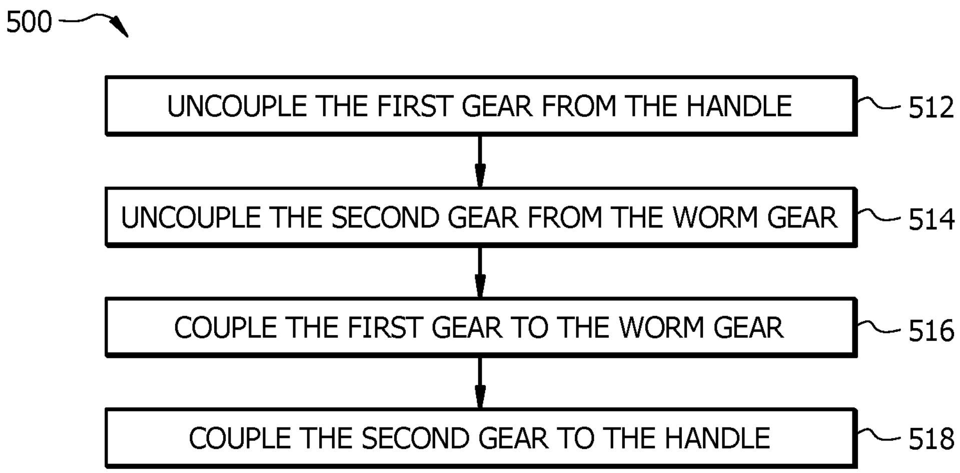
FIG. 5 is a flowchart illustrating an example method for modifying a gear ratio in a door operating system.

FIG. 5 is a flowchart illustrating an example method for modifying a gear ratio in a door operating system. The steps of FIG. 5 may be performed with respect to the components illustrated in FIGS. 2-4. As described above, an operator may swap bevel gears to modify the gear ratio in the door operating system.

At step 512, an operator uncouples the first bevel gear from the handle. At step 514, the operator uncouples the second bevel gear from the worm gear. The operator then swaps the gears. At step 516, the operator couples the first bevel gear to the worm gear. At step 518, the operator couples the second bevel gear to the handle.

Although the steps are described in a particular order, either the first or second bevel gear may be uncoupled first or they may be uncoupled at the same time. Similarly, either the first or second bevel gear may be coupled first or they may be coupled at the same time. Although a bevel gear is used in the example, other gears, such as helical gears may also be used.

Figure 6:
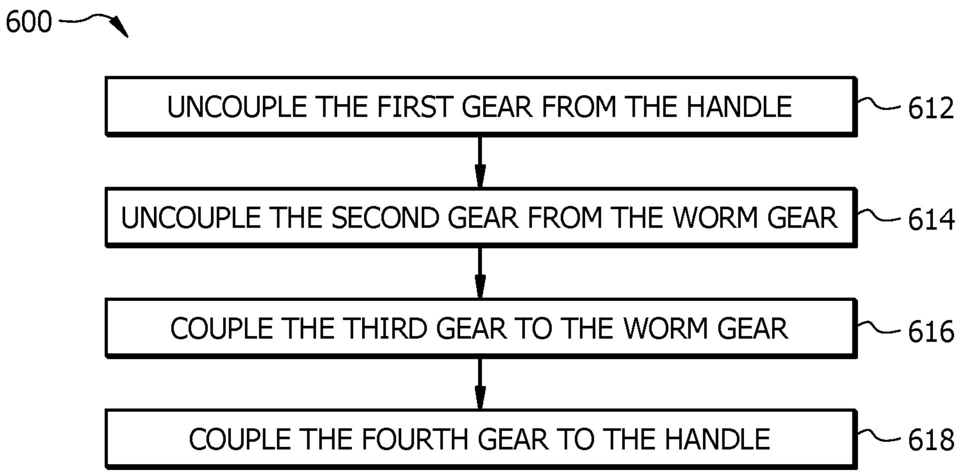
FIG. 6 is a flowchart illustrating another example method for modifying a gear ratio in a door operating system.

FIG. 6 is a flowchart illustrating another example method for modifying a gear ratio in a door operating system. The steps of FIG. 6 may be performed with respect to the components illustrated in FIGS. 2-4. As described above, an operator may swap bevel gears to modify the gear ratio in the door operating system.

At step 612, an operator uncouples the first bevel gear from the handle. At step 614, the operator uncouples the second bevel gear from the worm gear. The operator then swaps the gears for gears of different ratios. At step 616, the operator couples a third bevel gear to the worm gear. At step 618, the operator couples the fourth bevel gear to the handle. The third and fourth gears have the same center-to-center distance as the first and second gears but have a different gear ratio than the first and second gears.

Although the steps are described in a particular order, either the first or second bevel gear may be uncoupled first or they may be uncoupled at the same time. Similarly, either the third or fourth bevel gear may be coupled first or they may be coupled at the same time. Although a bevel gear is used in the example, other gears, such as helical gears may also be used.

Particular embodiments have one or more advantages. For example, particular embodiments improve process efficiency by reducing time to open and close doors with a gear mechanism. This also increases safety because the door opening speed and force may be easily modified for various designs. The handle force may also be changed as needed, optimizing ergonomics. Particular embodiments reduce cost in that most of the parts can be identical and used for different door designs that are different in weight and desired opening and closing speeds.

One experienced in the art can appreciate that there are multiple ways to vary the gear ratios. Multiple gears may be installed and with a chain or cable, an appropriate gear may be selected, such as with a multi-speed bicycle. Another option is a continuously variable system with a chain or cable. These may be designed to produce a constant torque at the handle, which optimizes opening speed without exceeding maximum handle force goals.

Particular embodiments are also applicable to double plug doors and sliding doors. Particular embodiments are also applicable to doors on other vehicles, such as trucks, marine vessels, etc. Particular embodiments may be applicable to doors on storage containers, buildings, etc.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of this disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Modifications, additions, or omissions may be made to the methods disclosed herein without departing from the scope of the invention. The methods may include more, fewer, or other steps. Additionally, steps may be performed in any suitable order.

The invention claimed is:

1. A door operating system comprising:

a rotating handle removably coupled to a first gear;

the first gear coupled to a second gear;

the second gear removably coupled to a worm gear;

the worm gear coupled to a rotating plate;

wherein rotation of the handle rotates the first gear which rotates the second gear which rotates the worm gear which rotates the rotating plate to cause the door to open or close; and wherein the first gear is swappable with the second gear to modify a gear ratio of the door operating system.

2. The door operating system of claim 1, wherein the first gear is a different size than the second gear.

3. The door operating system of claim 1, wherein the first gear comprises a bevel gear and the second gear comprises a bevel gear.

4. The door operating system of claim 1, wherein the first gear comprises a helical gear and the second gear comprises a helical gear.

5. The door operating system of claim 1, further comprising a third gear and a fourth gear, wherein the third gear and the fourth gear have a same center-to-center distance as the first gear and the second gear but have a different gear ratio than the first gear and the second gear, and wherein the third gear is swappable with the first gear and the fourth gear is swappable with the second gear to modify a gear ratio of the door operating system.

* * * * *